United States Patent
Nussbaumer et al.

(10) Patent No.: US 6,176,927 B1
(45) Date of Patent: *Jan. 23, 2001

(54) APPARATUS FOR COATING CONTAINER BODIES INTERNALLY

(75) Inventors: Hans-Jörg Nussbaumer, Wagen; Guido Huber, Schindellegi; Felix Walser, Hinwil, all of (CH)

(73) Assignee: Elpatronic AG, Bergdietikon (CH)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/926,379

(22) Filed: Sep. 9, 1997

Related U.S. Application Data

(62) Division of application No. 08/629,974, filed on Apr. 9, 1996, now Pat. No. 6,110,526.

(30) Foreign Application Priority Data

May 12, 1995 (CH) .................................................. 1379/95

(51) Int. Cl.[7] ........................................................ B05C 7/02
(52) U.S. Cl. .......................... 118/317; 118/306; 118/308; 118/DIG. 10
(58) Field of Search ..................................... 118/317, 306, 118/DIG. 10, 408, 254, 215, 308, DIG. 3, 622; 413/72–77; 198/577, 832.2, 579; 239/697, 708; 427/476, 421, 236, 239

(56) References Cited

U.S. PATENT DOCUMENTS

| 3,422,795 | * | 1/1969 | Smith ..................................... | 118/317 |
| 3,516,385 | * | 6/1970 | Walling ................................. | 118/317 |
| 4,869,201 | * | 9/1989 | Takahashi et al. .................... | 118/317 |
| 5,173,325 | * | 12/1992 | Knobbe et al. ....................... | 118/622 |
| 5,520,735 | * | 5/1996 | Mulder ................................. | 118/308 |
| 5,725,610 | * | 3/1998 | Wilson et al. ........................ | 118/317 |

* cited by examiner

Primary Examiner—Laura Edwards
(74) Attorney, Agent, or Firm—McCormick, Paulding & Huber LLP

(57) ABSTRACT

A coating apparatus with a spray head is provided for coating can bodies internally. The spray head is supplied with coating material through a feed line which passes through the seam welding machine for the container bodies. The combined spray and extraction head is also connected to a suction line which extracts excess coating material which has not been deposited on the internal walls of the container bodies, and returns it through the welding machine. In this way, the escape of coating material between the individual can bodies can largely be avoided, thus reducing contamination of equipment.

7 Claims, 1 Drawing Sheet

APPARATUS FOR COATING CONTAINER BODIES INTERNALLY

This is a divisional of co-pending application Ser. No. 08/629,974 filed on Apr. 9,1996 now U.S. Pat. No. 6,110,526.

BACKGROUND OF THE INVENTION

The invention relates to a method for coating container bodies internally as they emerge in succession from a welding machine. The invention further relates to an apparatus for coating container bodies internally as they emerge in succession from a welding machine.

It is known to coat containers or container bodies internally with liquid or powder lacquers. Special problems arise in the coating of container bodies, particularly can bodies, emerging in succession from a welding machine in which the longitudinal seam of the bodies has been welded. If only the welded seam is to be covered, it is known to convey coating material through the welding machine and to apply it to the welded seam. However, if the whole of the internal wall of the container is to be coated, problems arise, as the deposition rate is only approximately 60%, which means that approx. 40% of the coating material, which is in the form of a mist of powder or liquid particles, does not remain, but escapes from the body, contaminating the conveyor line and its surroundings.

To give an indication of the level of this contamination, it can be stated as an example that in order to coat the weld seam only on the internal wall of the body of a ½ kg can 114 mm long, approximately 100 mg of powder coating material must be sprayed, of which, assuming the deposition rate to be as stated, 40 mg passes into the environment. With a daily production of 500,000 cans, this results in a considerable quantity of powder being discharged into the environment, and which, despite recycling by an external extraction system, may cause damage eg. to the bearings of the conveyor line, and even to those of the welding machine. If the container body is to be coated over its whole internal circumference, ie. over 360°, the quantity of powder involved will be increased several times more.

SUMMARY OF THE INVENTION

Accordingly the object which lies at the basis of the invention is to provide a method, which does not possess or which mitigates the drawbacks which have been mentioned, for coating the whole of the internal walls of container bodies over the entire circumference.

This is achieved, in a method of the abovementioned kind, by feeding the coating material from the welding machine end and spraying it inside the can body more or less uniformly onto the internal wall, and by extracting sprayed coating material inside the can body for return and returning of the said material via the welding machine end of the spray process.

Because extraction of sprayed material takes place inside the can body itself, contamination of the environment with the coating material can be effectively prevented, as only a small amount of material remains to be removed by the external extraction system. The quantity of material which the external extraction system fails to remove is likewise reduced, resulting in a significant diminution in external contamination. The material in question is returned and can be disposed of or reused.

Furthermore the gap between adjacent can bodies in the coating area is preferably reduced with respect to the normal conveying gap, eg. by braking the bodies in front. This additional step enables a further reduction to be made in the coating material escaping through the gaps between successive bodies.

A further object of the invention is to provide an apparatus for coating container bodies internally in which the disadvantages which have been described can be avoided or reduced. This is accomplished in the abovementioned apparatus by providing at least one coating material feed line through the welding machine and at least one coating material return line through the welding machine, and by providing a spray and suction head connected to the feed and return lines and positioned so as to act on the interior of the can body. With a more uniform application over the circumference, there is a reduction in the amount of powder to be returned. This can be produced by a rotating spray head. Also, it is possible to provide for slightly more powder to be applied at the weld seam, to ensure that the step in level is satisfactorily covered.

BRIEF DESCRIPTION OF THE DRAWINGS

Embodiments of the invention will now be described in detail by way of example, with reference to the drawings, in which.

DESCRIPTION OF THE PREFERRED EMBODIMENTS

Figure 1:
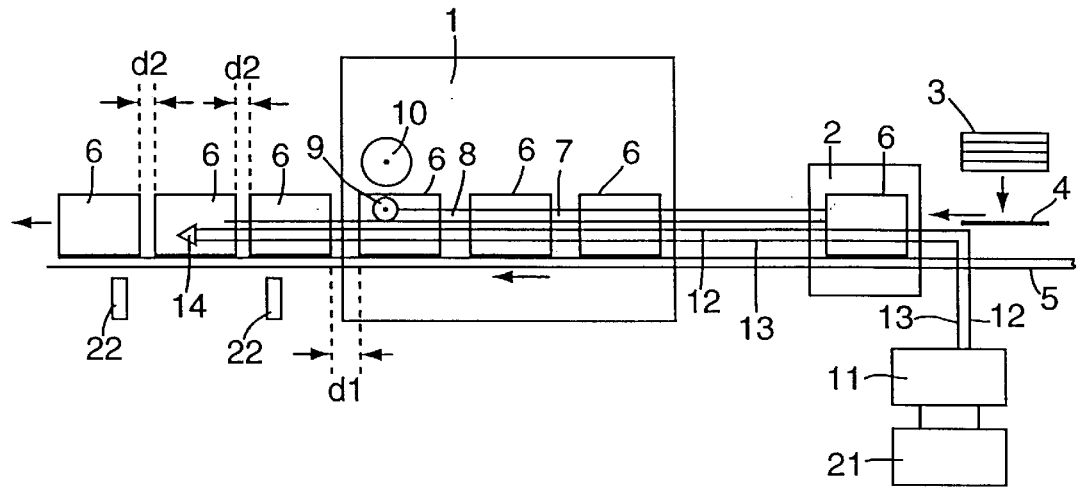
FIG. 1 shows an apparatus for coating can bodies internally, in highly schematic form, together with the corresponding equipment for forming and welding the can bodies.

A can body production line, which also includes an internal coating apparatus according to the invention, is shown in FIG. 1 in highly schematic form. This production line comprises a welding machine 1 in which the longitudinal seams of the can bodies are welded in a known manner. Can bodies are supplied to the welding machine in a known manner. Flat metal blanks 4 are removed singly from a stack 3 and are passed to a conveyor 5. The conveyor 5 conveys the blanks into a rounding unit 2 in which the flat blank is rounded into a can body 6. From the rounding unit 2 the can body is guided into the welding machine. Inside the welding machine, the can body is guided by a corresponding rail 7 (the so-called "Z-rail") so that a welded seam, usually a lap weld, can be formed by means of the welding rollers 10 and 9 in a known manner. The lower welding roller 9 is arranged on a welding arm 8 which is located inside the can body, a is the Z-rail 7. Wire electrodes (not shown) are normally used for the welding. The welded can bodies exit from the welding machine on the conveyor 5.

In accordance with the invention, an apparatus is provided for coating the internal walls of the welded can bodies, not only in the region of the welded seam, but the whole of the internal walls. For this purpose, a preparation and pumping unit 11 is provided for the coating material, which can be stored in a tank 21. The coating material itself is a known, commercially available coating powder which after being sprayed on to the internal wall of the can body fuses thereon and forms a coating after cooling. Fusion may occur through the residual heat following the welding of the can body, and/or separate heating may be provided. This is known in itself, and will not be described further. Instead of a coating material in powder form, a liquid coating material could be provided.

The coating material is fed into the can body from the welding machine end of the apparatus, that is to say, the feed line for the coating material comes from the welding machine. This means that it is necessary for the feed line to be introduced at the can body rounding stage and that it has to be made to pass through the welding machine inside the rounded and welded bodies. Both a feed line 12 for the coating material, and a return line 13 through which a part of the sprayed coating material is extracted back through the welding machine, are provided. In the example shown, extraction is performed by the same unit 11 as that which provides the feed; but other arrangements are also possible. The excess coating material extracted is fed back to the tank 21, and reused. A combined spray and suction head 14, connected to the lines 12 and 13, is provided within the can body itself.

According to a preferred arrangement, elements 22 are also provided on the conveyor to reduce the gap between bodies in the coating area, ie. after they.have been transported away from the welding machine, by reducing the speed of the can in front so that the next can catches up and the gap between cans is reduced. In FIG. 1 this is represented schematically, the gap between can bodies measuring dl before the coating area is reached and the smaller amount d2 in the coating area. At the welding point, the gap may be smaller, eg. 0.8 mm or less. This may be brought about eg. by the braking elements 22, which are shown only schematically, and which slightly brake the can bodies 6 before and after they leave the coating area so that the ensuing can body 6 (just emerging from the welding machine) closes up. The smaller gap d2 between bodies results in less excess coating material not being caught for extraction and escaping. This results in a further improvement in the method and apparatus.

The reduction in the gap can of course be brought about in other ways, eg. by providing two different conveyors, running at different speeds, one for the can bodies in the coating area and the other for the can bodies before the coating area. Other modifications of the installation shown in FIG. 1 can of course be made within the scope of the invention. Other welding machines, other conveyors, and other alternative means of forming and feeding the blanks 4, may be adopted.

Figure 2:
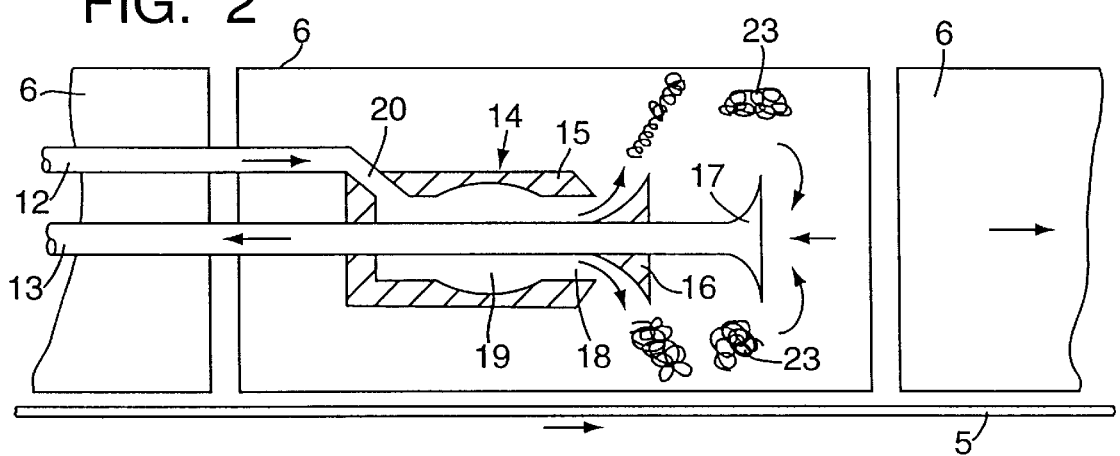
FIG. 2 shows a first embodiment of the combined spray and suction head.

FIG. 2 shows, likewise in a schematic and partly sectioned view, a first example of an embodiment of the combined spray and suction head 14. In this embodiment the head 14 has a first spray element 15 which cooperates with a second spray element 16 to form a spray nozzle 18. This spray nozzle may be a single annular nozzle 18, or several orifices arranged in a ring may be provided. The nozzle 18 is supplied with coating material by the feed line 12, which, in the example shown, has a connection 20 angled with respect to the conveying direction into a chamber 19 in the spray element 15. The resulting configuration, with the line 12 connected at an angle into the chamber, allows a particularly good swirl effect on the powder coating material, and thus a homogenous discharge of this coating material from the nozzle 18, to be obtained.

The embodiment shown is, of course, intended only as an example in this regard, and there are many possible alterations of the exemplified spray parts 15,16,19 and 20 which would also produce a highly uniform discharge of coating material over the entire internal wall of the can body 6: for example, the conical spray part 16 can be rotated. The spray and suction head 14 also has a suction opening 17 connected to the suction line 13. Coating material which has not been deposited on the internal wall of the can body, and which is freely suspended inside the body in the form of spray mist, is sucked into this funnel-shaped suction opening 17. Extraction via the funnel 17 and the line 13 needs to prevent, so far as possible, the spray mist 23 (the presence of which is merely suggested in the drawing) from escaping through the gaps between the successive can bodies 6, and from contaminating the equipment.

The illustrated configuration of the suction funnel 17 is also intended merely as an example. This funnel may be made larger or smaller, or the funnel-shaped configuration of the suction opening may be omitted altogether. The leading edge of the suction opening may also be located at a smaller or greater distance from the spray nozzle 18. The optimal design for each individual case can be relatively easily determined by experiment. In this example, the extraction always takes place after spraying, that is to say, downstream thereof in the can body conveying direction.

Figure 3:
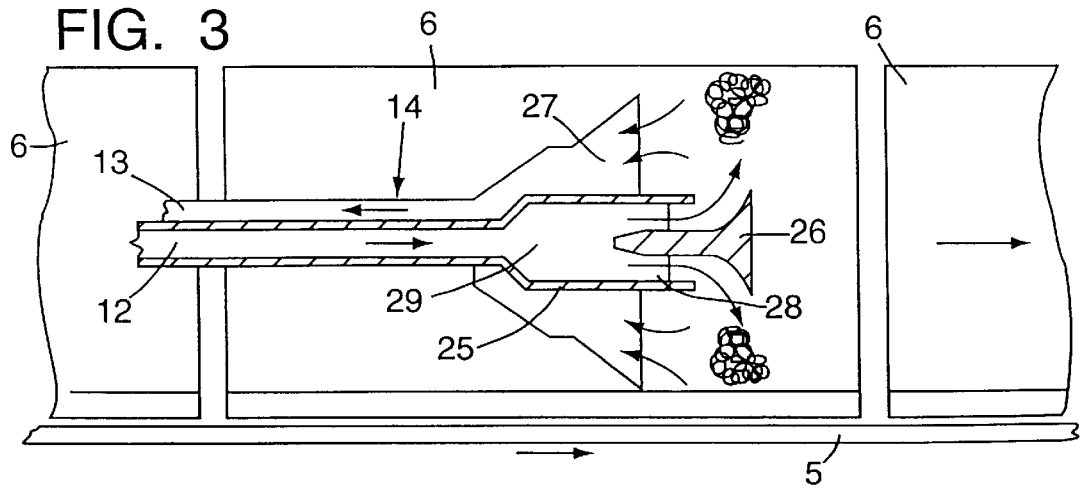
FIG. 3 shows a further embodiment of a spray and suction head.

FIG. 3 shows a further embodiment of a spray and suction head 14, in which extraction occurs before spraying, that is to say, upstream thereof in the conveying direction. A spray element 25 is again provided, which, together with an element 26, forms a spray nozzle 28. This spray nozzle may again be annular, or consist of individual orifices. The feed line 12 has in this case a straight connection to the spray element 25,26. As shown in the example, a chamber 29 may again be formed in the spray element 25, and may cause the coating material to be distributed more evenly. Further baffles or swirl elements could also be provided instead of or in addition to the chamber to produce a desired flow and distribution of coating material.

In the example shown, the suction element 27 is arranged as a ring surrounding the spray element 25 and forms a suction funnel which is connected to the suction line 13. The precise configuration of the suction element 27 and its distance from the nozzle 28 may be varied in many ways in this example also. This suction arrangement also serves to extract free, non-deposited coating material back through the line 13. Also the line 13 could be made annular and coaxial with the line 12.

What is claimed is:

1. Apparatus for coating open-ended container bodies internally with a coating material as they emerge in succession from a container body forming operation of a welding machine, the container body forming operation including conveying container bodies in a conveying direction, comprising at least one feed line for moving the coating the material through the welding machine;

at least one return line moving unused coating material through the welding machine; and a combined spray and suction head connected to the feed and return lines and for being positioned so as to act on the interior of the container body over its entire circumference, said spray and suction head including a nozzle for discharging the coating material and a chamber for receiving the coating material, prior to the discharge thereof by said nozzle, for providing a more homogeneous discharge of the coating material.

2. Apparatus according to claim 1, characterized in that the spray and suction head (14) has one or more spray orifices (18) arranged upstream of one or more extraction openings (17) in the container body conveying direction.

3. Apparatus according to claim 1, characterized in that the spray and suction head (14) has one or more spray orifices (28) arranged downstream of one or more extraction openings (27) in the container body conveying direction.

4. Apparatus according to claim 1 characterized in that a device is provided for reducing the gap between successive container bodies in the region of the spray and suction head.

5. Apparatus according to claim 1, characterized in that the spray head has a rotating element (16,26) to give a uniform distribution of the coating material over the circumference of the container body.

6. Apparatus according to claim 1 wherein the combined spray and suction head include a spray element directing the coating material outwardly toward an interior surface of the container body.

7. Apparatus according to claim 1, wherein the chamber has a longitudinal axis and the coating material is introduced in said chamber at a nonzero angle relative to said longitudinal axis.

* * * * *